United States Patent
Reiners et al.

[15] 3,682,025
[45] Aug. 8, 1972

[54] METHOD AND DEVICE FOR REGULATING A CAM-CONTROLLED MACHINE TOOL

[72] Inventors: Franz Reiners, Lambertshof, Post Bergl Erkelenz-Land; Georg Walk, Rheydt, both of Germany

[73] Assignee: A. Monforts, Monchengladbach, Germany

[22] Filed: July 8, 1969

[21] Appl. No.: 839,912

[30] Foreign Application Priority Data

July 9, 1968 Germany..........P 17 52 737.6

[52] U.S. Cl....................................82/1 C, 82/21 B
[51] Int. Cl. ...........................................B23b 1/00
[58] Field of Search.......82/21 B, 1 C, 34 D; 77/32.1, 77/25

[56] References Cited

UNITED STATES PATENTS

| | | | |
|---|---|---|---|
| 2,118,024 | 5/1938 | Potter et al.................. | 82/21 B |
| 2,656,589 | 10/1953 | Greene et al............... | 82/21 B |
| 3,255,635 | 6/1966 | Armytage................... | 77/32.1 |
| 3,259,002 | 7/1966 | Huff et al................... | 82/21 B |

*Primary Examiner*—Leonidas Vlachos
*Attorney*—Curt M. Avery, Arthur E. Wilfond, Herbert L. Lerner and Daniel J. Tick

[57] ABSTRACT

Method of regulating a cam-controlled machine tool, especially a turret lathe with a working spindle for a workpiece and a turret adjustable to various angular settings and in the longitudinal direction thereof, which includes effecting an adjustment of the axial end portion of the turret that is superimposed on the regulating movement.

6 Claims, 3 Drawing Figures

PATENTED AUG 8 1972 3,682,025

METHOD AND DEVICE FOR REGULATING A CAM-CONTROLLED MACHINE TOOL

Our invention relates to method and device for regulating a cam-controlled machine tool, especially a turret lathe with a working spindle for a workpiece and a turret adjustable to various angular settings and in longitudinal direction thereof.

In machines, such as turret-lathes especially, wherein a number of tools are employed, the setting up or tooling and retooling of the machine requires considerable time. If a deviation in a dimension is established during the machining operation, the machine must be shut down and a suitable correction in the dimension of the relevant tool must be effected. Due to the wear that takes place, an adjustment of the tools is furthermore required at specific time intervals.

In turret lathes, the axial position of the workpiece that is to be machined is determined by the bearing surfaces at the workpiece chuck. Due to chuck damage and wear produced in the course of time, refinishing or repair of the chuck is necessary. As a consequence of the change occurring thereby in the relative position of the workpiece and tool and therewith in the so-called neutral point position wherein the tool has a minimum spacing from the chuck, a suitable correction of the neutral point position of all the tools is again necessary.

These setting-up, retooling and adjusting periods are of greater consequence, the smaller the number of workpieces that are being machined. To shorten these periods and to simplify the adjustment of the tools, so-called setting-up or tooling aids are employed. Thus, it is for example known to mount jigs or templates at the workpiece chuck which, however, requires that the machine be shut down.

To reduce the downtime of the machine as much as possible, it has furthermore become known to pre-adjust the tools outside the machine by means of suitable devices; however, a large number of costly measuring instruments and devices are required therefor. Since this pre-adjustment is carried out during the machining operation, each machine requires a second set of tools for pre-adjustment while a first set of tools is present in the machine during performance of the machining operation.

A turret lathe wherein a correction of a dimension of the tool in the circumferential direction can be effected by suitable rectangular adjustment of the tool turret while the machine is running is already known from the British Pat. No. 1,112,947 which is assigned to the assignee of the instant application. However, a correction in dimension of the tool in longitudinal direction is not possible with this known device.

It is accordingly an object of our invention to provide method and device for correcting the neutral point position of a tool in a highly effective manner, preferably while the machine is running.

It is another object of our invention, when several machines of the same type are present, to provide such method and device which will adjust the tools to the same neutral point position by regulating the tools. A further object of our invention is to provide method and device for relatively simply adjusting the operating or cutting depth at the workpiece and to permit the tool to be raised from the workpiece so as to avoid the formation of return grooves or channels when carrying out a facing operation.

With the foregoing and other objects in view, we provide in accordance with our invention, method for regulating a cam-controlled machine tool which comprises effecting an adjustment of the axial end position of the turret which is superimposed on the regulating movement.

In accordance with another feature of the method of our invention, we simultaneously control the position of the tool turret and all of the tools carried thereby, so that the heretofore conventional and time-consuming adjustment of the individual tools in their respective holders is dispensed with.

In accordance with an additional feature of our novel method and in order to effect regulation of the neutral point position in a relatively simple manner, we displace a control drum and a terminal switch relative to one another so as to adjust the end position of the turret, it being necessary only that either the control drum or the terminal switch be displaced.

According to the device of our invention, the control drum is of unitary construction with the turret, and the terminal switch is mounted so that it is displaceable relative to the control drum.

According to a further feature of the device of our invention, we provide a manually actuable micrometer switch for effecting displacement of the terminal switch. By means of this extremely simple device, it is possible to adjust a number of machines of the same type wherein the various turrets are set in their end position at the same spacing from the bearing surfaces at the chuck.

According to still further features of the device of our invention and in order to regulate the neutral point position of the tools automatically to a predetermined value while the machine is running, we provide a servomotor for displacing the terminal switch, at least one pre-adjustable nominal value potentiometer for determining the axial end position of the turret, the nominal value potentiometer being connected to the motor for automatically actuating the same, and an actual value potentiometer, for sensing the axial position of the terminal switch, coordinated with the nominal value potentiometer. Adjustment of the machine is permitted also through this feature.

According to another feature of the device of our invention, a separate nominal value potentiometer is coordinated with each operative setting of the turret and determines the axial end position of the turret in the respective operative setting. The possibility is thereby afforded to effect both a correction of the neutral point position as well as an adjustment of the operating or cutting depth of the tool for each operative setting of the turret independently of the other settings thereof, whereby the tools, moreover, after completion of a cross feed, can be automatically disengaged from the workpiece so as to avoid formation of return grooves or channels in the workpiece.

Other features which are considered as characteristic for the invention are set forth in the appended claims.

Although the invention is illustrated and described herein as method and device for regulating a cam-controlled machine tool, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawings, in which.

Figure 1:
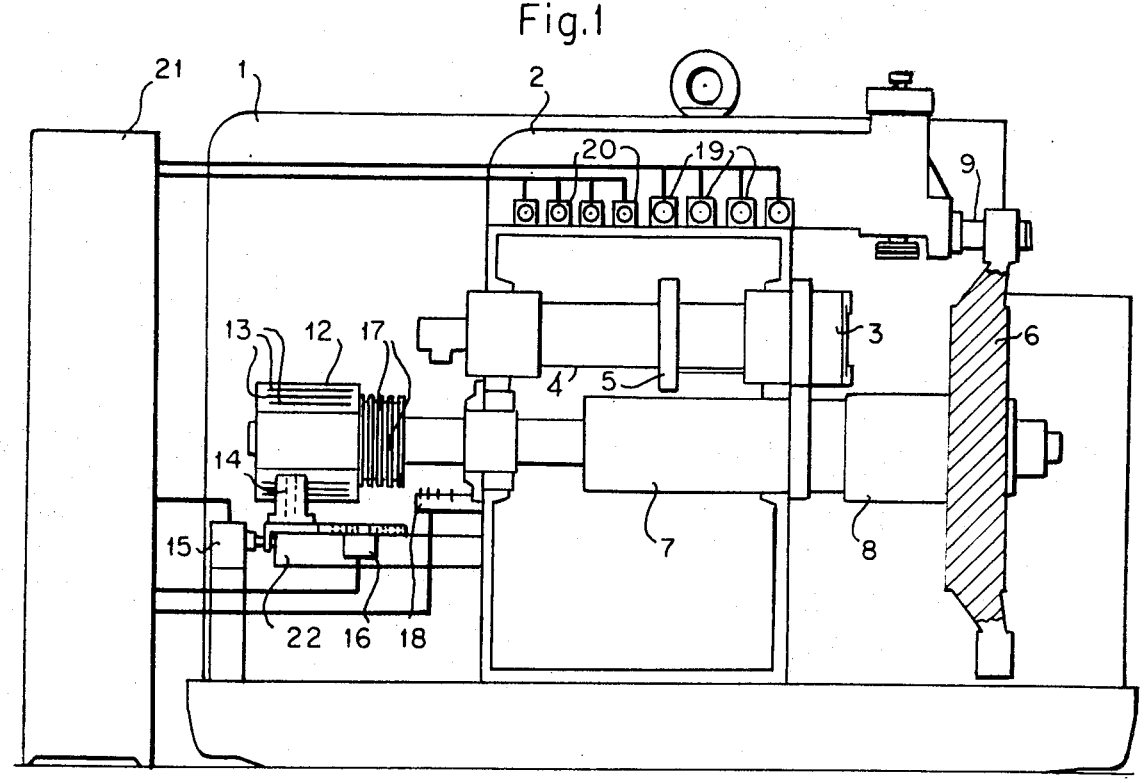
FIG. 1 is a side elevational and partly schematic view of a cam-controlled machine tool provided with device for regulating the same in accordance with our invention.
Figure 2:
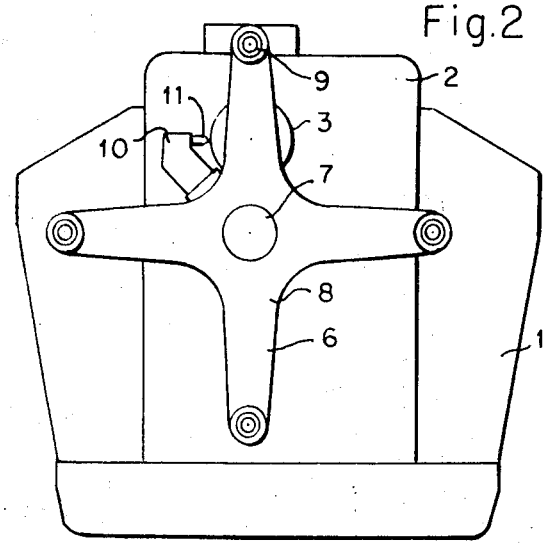
FIG. 2 is a front elevational view of FIG. 1.

Referring now to the drawing and first particularly to FIGS. 1 and 2 thereof, there is shown a machine tool in the form of a turret lathe 1 having a spindle stock 2 wherein a working spindle 4 carrying a chuck 3 is rotatably mounted. A gear 5 secured to the working spindle 4 meshes with a non-illustrated conventional drive mechanism transmission for rotating the spindle 4. A turret 8 having a 4-armed turret star or turnstile 6 and a turret shaft 7 and being angularly adjustable to four operative settings as well as being axially displaceable, is mounted below the working spindle 4. The turret turnstile 6 is provided with a bore at the extremity of the four arms thereof, through which an indexing pin 9, mounted on the spindle stock 2, is insertable for fixing the turnstile 6 in the respective four operative settings thereof. The indexing pin 9, for the purpose of axially parallel displacement thereof in the peripheral direction, may be provided with a device known from the aforementioned British patent.

In FIG. 2, there is shown a tool 11 mounted in a holder 10 on the turret turnstile 6 substantially at the level of the working spindle 4. Axial movements of the turret 8 are controlled by a control drum 12 mounted on the turret shaft 7. The drum 12 is provided with cams 13 which act upon a terminal switch 14 whose position in axial direction relative to the control drum 12 determines the end position of the turret 8 and the revolver turnstile 6 and therewith the neutral point location of the tool 11 secured to the turret turnstile 6. This neutral point location can be controlled by relative displacement of the terminal switch 14 and the control drum 12.

In the embodiment shown in FIG. 1, the adjustment of the end position of the turret 8 results from a displacement effect by a servomotor 15 of the terminal switch 14 in direction parallel to the control drum 12. The axial position of the terminal switch 14 is sensed or detected by an actual valve potentiometer 16. Four adjustable cams 17 are additionally provided on the control drum 12 for actuating four contacts, respectively, of a terminal switch 18. In the illustrated case of a turret lathe with a four-armed turret turnstile, there is provided for each of the four operative settings of the turret, respectively, a cam 17 and a contact of the terminal switch 18 actuable by the respective cam 17 for registering the respective operative position of the turret. A manually pre-adjustable nominal value potentiometer 19 is coordinated respectively with each of the four contacts of the terminal switch 18 and therewith with each of the four operative settings, respectively, of the turret 8. A respective manually actuable selector switch 20 is furthermore coordinated with each of the nominal value potentiometers 19 for raising the tool from the workpiece. All of the controls and circuitry for adjusting the neutral point location, registering the turret setting, raising the tool from the workpiece as well as reversibly controlling the servomotor are located on or in a switch cabinet 21 and are of conventional construction and design readily known to a man of ordinary skill in the art.

The operating cycle for the machine tool employing the regulating device and method of our invention is carried out in the hereinafter described manner. The four nominal value potentiometers 19 are manually pre-adjusted to the desired value, for example to determine or fix the operative or cutting depth of the tool at the workpiece. After a machining step has been completed, the turret 8 is released from the indexing pin 9 by being withdrawn toward the right-hand side of FIG. 1, and is turned through an angle of 90°. In this withdrawn position of the turret 8, the cams 17 on the control drum 12 are located in the vicinity of the terminal switch 18 so that the cam 17 corresponding to the new operative setting of the turret 8 actuates the contact at the terminal switch 18 appertaining thereto and, thereby, switches one of the nominal value potentiometers 19 into the regulating circuit through the non-illustrated wiring of the switch cabinet 21. The turret 8 is then pushed back toward the working spindle 4 and is again fixed in an operative position by the indexing pin 9 similar to the manner shown in FIG. 1 except that the turret 8 has been turned through an angle of 90° in a plane perpendicular to the plane of the drawing. The working spindle 4 with the workpiece clamped in the chuck 3 is placed in rotation as the turret 8 and the working tool thereof, as shown for example in FIG. 2, are simultaneously fed in the axial direction i.e. perpendicularly to the plane of FIG. 2. The machining operation, i.e. the turning operation of FIG. 2, for example, is then carried out until the turret 8 reaches its axial end position which is determined by the terminal switch 14.

If the values of the pre-adjusted nominal value potentiometers 19 and of the actual value potentiometers 16 registering the setting or location of the terminal switch 14 are analogous, then the terminal switch 14 is in the desired location.

If, however, the values of both potentiometers 16 and 19 are not analogous, a displacement of the terminal switch 14 by the servomotor 15 is produced through the circuitry and controls of the switch 21 until the reading of the actual value potentiometer 16 is in agreement with the reading of the nominal value potentiometer, and the terminal switch 14 is located in the desired position thereof.

When the turret 8 reaches its end position in the axial direction thereof, the terminal switch 14 is actuated by one of the cams 13, the operating feed of the turret 8, i.e. in the axial direction when performing the turning operation of FIG. 2, is halted, and the turret 8 is returned in axial direction i.e. displaced toward the left-hand side of FIG. 1, and the subsequent adjustment thereof into the next operative setting is effected.

As is well known, facing operations can also be carried out on turret lathes, for example by means of slides displaceable transversely to the working spindle 4. In order to prevent the formation of grooves or channels in the workpiece during the return motion of the slide, an additional resistance is cut into the regulating circuit by actuating that selector switch 20 which corresponds to the then operative setting of the turret 8 when the latter has attained its axial end position so that the readings of the respective potentiometers 16 and 19 become no longer analogous. They are therefore again adjusted and balanced by displacing the terminal switch 14 so that the turret 8 is shoved back a specific distance opposite to the axial direction of feed thereof and the tool 11 is raised from the workpiece. Since the resistance added to the regulating circuit is the same for all the operative settings of the turret 8, all of the tools carried by the turret turnstile 6 are raised the same distance. By switching the selector switch 20 off, if desired, raising of the tool from the workpiece can be prevented.

Once the nominal value potentiometer 19 is adjusted, the turret 8 is set so that the tool performing the operation automatically provides the same operating or cutting depth in a number of identical workpieces that are machined in succession. To calibrate or standardize a number of identical machines, they can be adjusted to absolutely the same operating or cutting depth with the aid of the device of our invention.

If a change produced by wear in the neutral point location of a single tool is to be compensated, it is sufficient to effect an adjustment of the end position of the turret in the respective operative setting. When the neutral point location of all the tools is changed, for example after the chuck has been suitably machined, an adjustment of the end position of the turret to an equal value for all of the operative settings must be carried out.

Furthermore, instead of four nominal value potentiometers 19, only a single one need be provided; in which case, either the end position of the turret is simultaneously adjusted to the same extent for all the operative settings, or after each adjustment of the turret into the next operative setting, a new pre-adjustment of the nominal value potentiometer must be effected.

Figure 3:
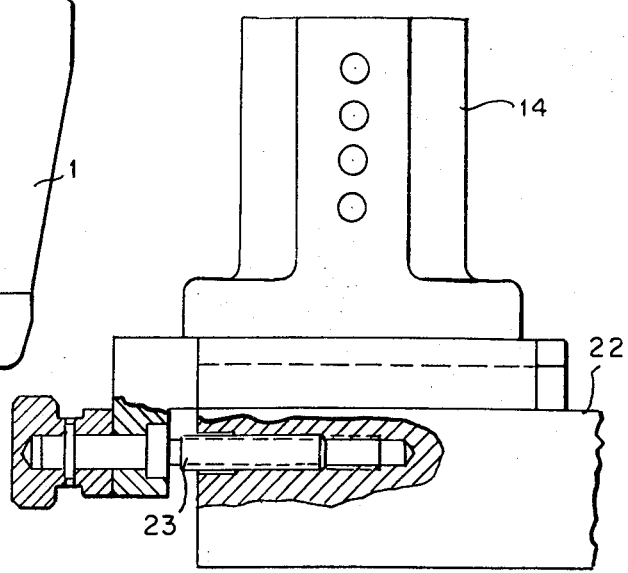
FIG. 3 is an enlarged view, partly broken away, of a modified form of part of the device shown in FIG. 1.

An embodiment of a relatively simple device for adusting the end position of the turret 8 is shown in FIG. 3 in enlarged view. As shown therein, the terminal switch 14 of FIG. 1 is displaceable on a guide 22 by a manually actuable micrometer screw 23 instead of the servomotor 15 of FIG. 1. With this simplified device, it is possible, however, to simultaneously adjust the end position of the turret only to the same extent for all operative settings thereof; as aforementioned, this is, for example, necessary after completion of a suitable machining operation on the chuck.

We claim:

1. In a method of regulating a cam-controlled machine tool having a rotary working spindle for a workpiece chuck and a multitool-carrying turret, the chuck and the turret being relatively moveable so that the tools carried by the turret are respectively in neutral point position in which they are minimally spaced from the chuck, the turret being adjustable to various angular settings and controllably displaceable in axial direction to an end position thereof, the step of superimposing an adjustment of the end position of the turret in the axial direction thereof on a control displacement of the turret in the axial direction thereof as to regulate the neutral point location of the tools parallel to the turret axis.

2. Method according to claim 1 which includes relatively displacing a control drum angularly and axially movable with said turret, and a terminal switch for adjusting the axial end position of the turret.

3. Device for carrying out a method of regulating a cam-controlled machine tool having a rotary working spindle for a workpiece chuck and a multitool-carrying turret, the chuck and the turret being relatively movable so that the tools carried by the turret are respectively in neutral point position in which they are minimally spaced from the chuck, the turret being adjustable to various angular settings and controllably displaceable in axial direction to an end position thereof, comprising a control drum having a unitary construction with said turret so that it is angularly and axially movable therewith, means for controllably displacing said control drum and said multitool-carrying turret therewith in axial direction thereof, and a terminal switch mounted adjacent said control drum and relatively displaceable of the turret in axial direction thereof on a displacement of said turret by said controllably displacing means so as to regulate the neutral point location of the tools parallel to the turret axis.

4. Device according to claim 3 including a manually actuable micrometer screw operatively connected to said terminal switch for displacing the same relative to said control drum.

5. Device according to claim 3 including nominal value potentiometer means pre-adjustable for fixing the end position of said turret in axial direction thereof, actual value potentiometer means for sensing the actual position of said terminal switch in said axial direction, servomotor means operatively connected to said nominal and actual valve potentiometer means and to said terminal switch and being automatically actuable in response to a difference between said nominal and actual values for displacing said terminal switch relative to said control drum for adjustably displacing said turret in axial direction to the end position thereof whereby said nominal and actual values are equal.

6. Device according to claim 5 including a plurality of tools carried by said turret and respectively adapted, in each of said angular settings of said turret, for performing a different operation on the workpiece, said nominal value potentiometer means comprising a plurality of potentiometers, each coordinated with one of said settings of said turret for fixing the end position of said turret in the axial direction thereof for the respective setting of said turret.

* * * * *